United States Patent

Loeber et al.

[11] Patent Number: 5,544,020
[45] Date of Patent: Aug. 6, 1996

[54] KEYBOARD HAVING VISIBLE AND INVISIBLE STATES

[75] Inventors: Peter J. Loeber, Ferring, England; Peter W. Hurst, deceased, late of Littlehampton, by Linda S. Hurst, George R. Bosworth, legal representatives; George R. Hurst, legal representative, Pulborough, both of Great Britain

[73] Assignee: Eurotherm Recorders Limited, West Sussex, England

[21] Appl. No.: 949,259

[22] PCT Filed: May 21, 1991

[86] PCT No.: PCT/GB91/00794

§ 371 Date: Nov. 12, 1993

§ 102(e) Date: Nov. 12, 1993

[87] PCT Pub. No.: WO91/18265

PCT Pub. Date: Nov. 28, 1991

[30] Foreign Application Priority Data

May 21, 1990 [GB] United Kingdom ............ 9011344

[51] Int. Cl.[6] .................... G01D 11/28; G09F 13/20
[52] U.S. Cl. .................................................. 362/29
[58] Field of Search .......................... 362/26, 29, 30, 362/31, 34, 84; 235/145 R

[56] References Cited

U.S. PATENT DOCUMENTS

| | | | |
|---|---|---|---|
| 2,594,903 | 4/1952 | Freedman et al. | 362/84 |
| 2,931,117 | 4/1960 | Bosworth et al. | 362/29 |
| 3,363,257 | 1/1968 | Dewey et al. | 362/84 |
| 5,075,826 | 12/1991 | Lan | 362/31 |

FOREIGN PATENT DOCUMENTS

| | | |
|---|---|---|
| 2055694 | 3/1981 | United Kingdom . |
| WOA8702813 | 5/1987 | WIPO . |

OTHER PUBLICATIONS

Medizintechnik, vol. 29, No. 2, 1989, Berlin DD, pp. 58–59; Von Holger Zorn 'Mehrkanalige Langzeitregistrierung Langsamverlaufender Fuktionen'.

Primary Examiner—Denise L. Gromada
Assistant Examiner—Sara Sachie Raab
Attorney, Agent, or Firm—Rosen, Dainow & Jacobs Limited Liability Patnership

[57] ABSTRACT

A chart recorder or other instrument has a window 10 within which is a key panel 1 composed of materials which are transparent in normal conditions. Incorporated in or associated with the individual elements of the key panel are display elements 22 applied to the transparent window material 20. The display elements are normally transparent but become visible, for example by fluorescence, when illuminated by radiation transmitted through the body of the transparent window material 20, rendering the key panel visible when needed for use.

18 Claims, 2 Drawing Sheets

KEYBOARD HAVING VISIBLE AND INVISIBLE STATES

This invention relates to display devices and has particular but not exclusive reference to the construction of keyboards and the like.

It is an object of the invention to enable a symbol, character, image or the like to be displayed in conjunction with another display, or an observation window or the like, in such a way that the other display, or the observation window is normally required to be unobstructed and can be made with the greatest possible area.

One application of the present invention is in chart recorders and other devices, in which an instrument or recorder incorporates a window or is placed behind a window, through which it can be observed in normal operation. Such devices may be provided with operating buttons, keyboards and the like, for controlling or adjusting their operation, inputting an outputting information, and so on. Providing conventional push buttons, keyboards and the like will often either reduce the area available for the observation window or increase the overall size of the device. It is an object of the invention to provide for an auxiliary display, either forming part of an input-output system or simply as a display, which does not reduce the space available for the window and which when not in use does not obstruct the normal observation of what lies behind the window.

According to tone aspect of the present invention, a recording or measuring device or the like is provided with an observation window through which it can be observed in normal operation, and the window is provided with at least one display element having an operative state in which it is visible and an inoperative state in which it is substantially invisible.

According to another aspect of the present invention, a display device comprises a transparent substrate, for example a panel of transparent material, at least one symbol, character, image or the like provided on a surface of the substrate and normally substantially transparent and means for illuminating the display element with radiation to which the said element is responsive, for example visible or ultraviolet light, thereby to render the element visible.

According to a further aspect of the invention there is provided a keyboard device comprising a transparent panel, transparent circuit elements thereon defining a keyboard, at least one radiation-responsive display element forming part of or in register with at least one said circuit element, said display element being normally transparent, and a radiation source for selectively irradiating the display element thereby to render it visible for revealing the keyboard.

The display element may have an active response to the radiation, e.g. fluorescence, chemoluminescence, polarisation etc.

Conveniently, the display element is fluorescent, and is illuminated by radiation transmitted within the panel or substrate acing as a light guide.

Alternatively the display element may comprise a local change in composition, surface texture or other physical characteristic of the panel or substrate, such as to scatter or otherwise passively redirect light when illuminated and thereby to reveal the positions of the elements. To enhance transmission of the activating radiation from the substrate to the display element, the display element may be composed of a medium which etches or otherwise modifies the surface of the substrate.

Yet another possibility is the use of display elements responsive to an applied electrical stimulus e.g. liquid crystal elements rendered visible by an applied voltage.

The substrate is preferably provided with transparent electrical tracks or circuit elements in predetermined relationship with the display element or elements, and forming part of a keyboard or the like, all composed of electrically conductive substantially transparent material, for example indium tin oxide (ITO), to form a keyboard or the like which is normally invisible but can be rendered visible, in effect, e.g. by application of radiation to activate the display element or elements, so that the display elements reveal the positions of the keyboard components.

The display elements may be separate from but in register with the tracks or circuit elements, or may be combined with the tracks or circuit elements.

The present invention has a particular, but not exclusive, application to keyboards for chart recorders and similar instruments.

Modern electronic chart recorders are complex instruments, incorporating data-processing electronics capable of being programmed. Such instruments are commonly provided with a keyboard of some kind, for use by the regular operator to control the recorder and to enter or extract information. This may be for example a simple numeric keypad or dedicated keys.

It is also desirable that the circuitry be accessible at a higher level of operation, for example by a supervisor or by a programmer to change the programming of the controlling electronics. Such a person may require the use of more extensive input/output facilities, in particular a full alphanumeric keyboard. It is also desirable that these more extensive access facilities should not be usable by the normal operator.

These requirements can be met, for example, by the provision of an input/output port, through which a separate terminal or other peripheral device can be connected to the recorder for example to enter text strings. This is inconvenient. It is also possible to provide a keyboard for the operator and a separate full text keyboard for use by a supervisor or programmer, but if this is done using conventional keyboard constructions, the full text keyboard inevitably occupies a considerable amount of space on the front panel of the instrument, which either increases the size of the front panel or reduces the area available for viewing the recording chart in operation, which of course is an essential features of a chart recorder.

In accordance with the present invention, a full text keyboard can be incorporated in the viewing area of the front panel. Normally, a source of activating radiation is not in operation and therefore the keyboard is not visible, leaving the entire area of the front panel or viewing window unobstructed for observation of the chart by the normal operator. When a programmer or supervisor wishes to use the full text keyboard, the source of activating radiation is energized, thereby rendering this keyboard visible within the normal viewing area.

It is to be understood that the electrical elements of this keyboard may remain invisible, but their positions are indicated by the activation of display elements in register with them, enabling them to be used.

The invention will be further described with reference to the accompanying drawings, which illustrate one embodiment of the invention, by way of example only, and in which.

Figure 1:
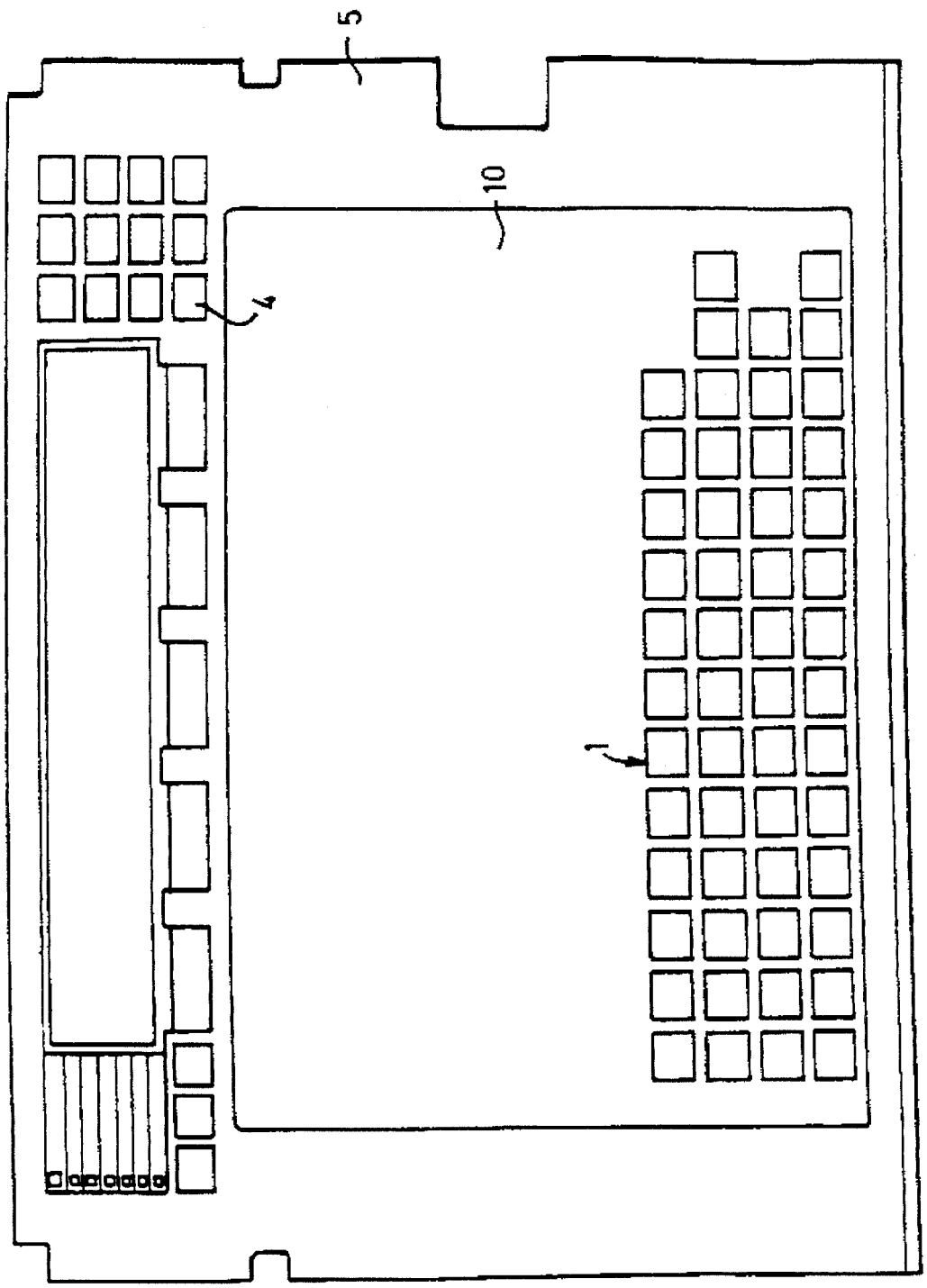
FIG. 1 is a front view of a chart recorder panel

FIG. 1 shows the front panel of an electronic chart recorder. The panel is made of a transparent synthetic resin sheet material for example an acrylic sheet or a polycarbonate sheet, with a thickness of, for example, 3 mm. It forms or is set into the front of a housing of the chart recorder.

The central region 10 of the panel is transparent. The peripheral region 5 is opaque, for example grey. The clear region 10 forms an observation window through which an operator can observe the chart or charts within the housing.

It is to be understood that the chart recorder mechanism and electronic circuitry can take any convenient form and constitute no part of nor limitation of the present invention. In accordance with conventional practice, the chart recorder comprises a closed housing within which is a mechanism for advancing a recording chart, and pens, printing means or the like for marking the chart as it advances, to provide a record of one or more variables with time. The marked chart can be inspected at any time through the observation window to show the current and past values of each variable, and is subsequently removed as a permanent record. Input signals to the chart recorder, for example from industrial process sensors, are processed by electronic circuitry in the chart recorder before being displayed.

The upper region of the illustrated panel, above the window 10, incorporates an operator's keyboard and operating display devices, although these are optional and not an essential part of the invention. By way of example only, a conventional numeric keypad 4, for example a conventional membrane keyboard, is provided in the upper right corner of the opaque peripheral area, this keypad is intended for everyday use by the normal operator of the chart recorder. The upper region of the panel may also contain display regions. This keypad and display regions are connected to the electronic controlling and signal-processing circuitry of the chart recorder and are employed in the every-day use of the chart recorder.

In the lower region of the panel, within the clear observation window area 10, is a keypanel, such as a full alphanumeric key panel 1, also connected to the controlling and signal-processing circuitry. In normal conditions this is substantially invisible and it does not significantly impede the observation of the recording charts. For use by a programmer, it can be made visible. At this time, it partly obstructs the observation window but this does not matter.

The key panel 1 can access the circuitry at a relatively high level of operation, suitable for use by a supervisor or by a programmer, as explained previously. The operator's keypad 4 can access the circuitry only at a lower level of operation, appropriate to everyday operations during the normal operation of the chart recorder. Accordingly, it is important that the viewing window be unobstructed while an ordinary operator uses the keypad 4, but it is not important that the window may be partly obstructed by the key panel 1 when this is being used by a supervisor or programmer, as this will happen rarely and will not normally require that the user be able simultaneously to observe the recording chart with ease.

The positions of the operating keys of the keyboard 1 are indicated in FIG. 1 by respective rectangles. Each of these is associated with one or more display elements which are normally invisible but can be rendered visible to indicate the positions and functions of the individual keys. The construction of this keyboard is shown in FIG. 2.

Figure 2:
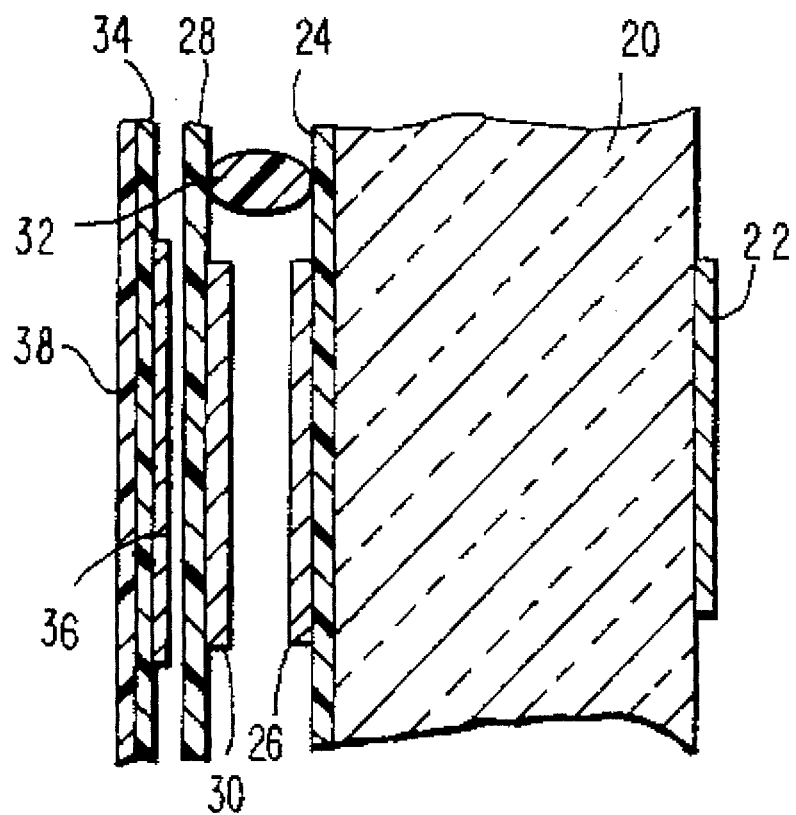
FIG. 2 is a fragmentary cross-section of a lower region of the panel, enlarged.

FIG. 2 shows, in cross-section, a portion of the transparent plastics panel. On the rear surface of the panel are individual normally transparent display elements 22, for example individual alphanumeric characters or other key-identifying symbols. In the described embodiment they are fluorescent, but other modes of activation can be used within the scope of the invention.

In front of the plastics panel is a transparent membrane keyboard, with individual key elements comprising contact pads 26, 30 in register with the corresponding display elements 22.

The membrane keyboard includes a rear sheet of polyester material 24 adhered to the front surface of the window panel 20, and individual contact pads 26 and associated tracks deposited on the front surface of the polyester sheet 24, the contact pads and tracks being made of transparent indium tin oxide (ITO). In front of this is a further, flexible, polyester sheet 28 carrying on its rear surface transparent ITO key contact pads 30 and connecting tracks for these, the pads 30, in register the pads 26, and display elements 22 all being in register. The polyester sheets 24, 28 are separated by spacers 32 between adjacent key contact pad positions so that operation of one key will not affect adjacent keys.

In front of the polyester sheet 28 is a further flexible polyester sheet 34, on the rear surface of which is reverse silk screen printed artwork 36.

The front of the polyester sheet 34 carries a hard coat protective layer 38, also transparent. Thus, all constituents of the keyboard 1 are transparent. The spacers 32 are preferably made of a transparent or translucent material, but since these will normally be very narrow they will not seriously impede observations of the chart behind the keyboard even if they are not transparent.

To render the display elements 22 visible, a light source 40 (FIG. 3) at the lower edge of the panel, when lit, injects radiation into the panel, this radiation being of a wavelength which will cause the display elements to become visible, in particular to fluoresce. The radiation will usually be visible radiation but may be ultraviolet. The refractive index of the panel material is such that the radiation, having entered the panel, is substantially trapped within the panel by total internal reflection, so that the panel, when viewed, does not appear to be illuminated. However, at the positions of the display elements 22, radiation will leak from the surface of the panel because of the local change in the refractive index of the adjacent medium and/or in the surface flatness of the panel under the display element. Radiation will therefore pass from the panel into the medium of the display elements, causing it to become visible and render the display elements visible. The keyboard 1 is thereby revealed to a user, although the electrical elements of the keyboard remain invisible, the light from the display elements passing out through them. The areas between the display elements remain effectively transparent and unilluminated.

The display elements, when not illuminated, are transparent as already described. The nature of the ink or other medium used to form the display elements is selected, as to its nature, density and thickness, to ensure the transparency and invisibility of the display elements.

The display elements can be applied for example by silk screen printing. The printing medium may for example be a fluorescent ink-varnish composition. The ink type used, the proportion of ink to varnish and the thickness of the printing screen all affect the ratio of transparency when not illuminated to luminance when illuminated, and therefore the visibility of the keyboard. Different coloured display elements can be achieved by using different ink colours in the printing medium. Alternatively difference coloured display elements can be achieved by interposing a colour filter between the light source and the display panel.

For maximum visibility of the display element, clearly the greatest possible amount of light should be introduced into and trapped within the panel, and then the maximum amount of light emitted from the display elements is to be transmitted to the front of the display.

The transmission of light into the display elements and therefore the intensity of illumination can be enhanced, if the rear surface of the panel is slightly roughened or recessed behind the display elements. This can be achieved by using an ink which will etch the material of the panel.

Figure 3:
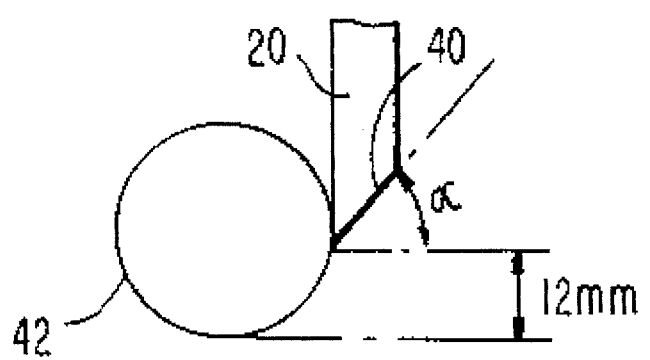
FIG. 3 illustrates one possible arrangement of the radiation source for rendering the keyboard visible.

The light source and its relation with the panel should be such as to maximise light input into the panel. Preferably, the light source would extend along and directly adjacent to the bottom edge of the panel. However, if there is not enough space for this arrangement, the light source may be arranged adjacent to a face of the panel, close to an edge of the panel, with the panel edge beveled or chamfered so that light entering the panel through its face is reflected by the internal surface of the chamfered edge into the interior of the body of the panel. Such an arrangement is illustrated by FIG. 3. The angle α of the lower edge may for example be 50° from a right-angled edge, that is to say, the included angle between the internal surface of the edge and the internal surface of the light-emitting face is for example 40°.

The chamfered edge surface 42 may be externally silvered to improve conduction of light into and along the panel.

If there is any printing on the panel between the light source and the keys, it is preferably overlaid on silver or white to minimise light loss from the panel at the print positions, e.g. in region 5 in that portion at the bottom of the panel.

The described combination viewing panel and keyboard has a number of significant advantages. Without reducing the effective viewing area, it permits entry of alpha-numeric information by a user without the need of additional devices. Because the size of the keyboard is not subject to any limitation, a full character set of keys can be provided, avoiding the use of shift keys, and the individual keys can be large enough for easy operation (a key size of at least $100^2$ mm is normally recommended).

Numerous variations are possible within the scope of the invention. For example, the keyboard may have any desired layout. Although plastics materials have been mentioned as panel materials, a glass panel may also be used.

The upper and lower keyboards may form part of a single tough-panel keyboard overlay covering the entire area of the transparent panel 1 and incorporating all necessary colouring to define different areas of the observation window and the respective keyboards and display areas. Alternatively, separate upper and lower keyboard assemblies may be provided. The upper keyboard may be omitted or placed elsewhere on the instrument.

It will be understood that the lower "invisible" keyboard may incorporate display elements additional to those specifically associated with individual keys, for example warnings and other information applicable to programming operations.

We claim:

1. In a chart recorder which advances and makes a recording chart, the chart recorder comprising an observation window through which the chart is visible in use and control circuitry for controlling the chart recorder, the improvement comprising a plurality of transparent circuit elements coupled to said control circuitry, each of said circuit elements positioned at a respective position within said window, said circuit elements defining at least partially a keyboard, at least one radiation-responsive display element spatially positioned at a respective position corresponding to the position of at least one of said circuit elements, said at least one display element being normally transparent, and a radiation source for selectively irradiating said at least one display element thereby to render said at least one display element selectively visible for revealing the corresponding position of said at least one circuit element.

2. The chart recorder of claim 1 comprising a transparent panel within said window which supports said transparent circuit elements and said at least one display element.

3. The chart recorder of claim 2 in which said at least one display element is fluorescent, and is illuminated by radiation transmitted within said panel from said source, said panel being disposed as a light guide between said source and said display element.

4. The chart recorder of claim 3 in which said radiation source is placed adjacent an edge of said panel.

5. The chart recorder of claim 4 in which said edge of said panel is beveled, said beveled edge having an internal surface, and said radiation source is placed to direct radiation through a face of said panel onto said internal surface of said beveled edge for total internal reflection within said panel of the radiation transmitted to said beveled edge.

6. The chart recorder of claim 2 in which a face of said panel is modified at the position of said at least one display element for enhancing the visibility of said at least one display element when irradiated.

7. The chart recorder of claim 6 in which said panel face is modified by etching.

8. The chart recorder of claim 2 in which said panel is a transparent membrane and said at least one circuit element is a keyboard membrane element.

9. The chart recorder of claim 2 in which said display element is separate from but aligned with said circuit element.

10. The chart recorder of claim 2 in which said at least one circuit element is coupled to access said control circuitry of the recorder at a first higher level and in which an operator's keyboard is provided which can access the circuitry only at a second lower level.

11. A keyboard device comprising a transparent panel, a plurality of transparent circuit elements positioned on said transparent panel defining at least partially a keyboard, at least one radiation-responsive display element spatially positioned on said panel corresponding to at least one of said circuit elements, said display element being normally transparent, and a radiation source for selectively irradiating said at least one display element thereby to render it selectively visible for revealing the position of said at least one circuit element.

12. The keyboard device of claim 11 in which said at least one display element is fluorescent, and is illuminated by radiation transmitted within said panel from said source, said panel being disposed as a light guide between said source and said display element.

13. The keyboard device of claim 12 in which said radiation source is placed adjacent an edge of said panel.

14. The keyboard device of claim 13 in which said edge of said panel is beveled, said beveled kedge having an internal surface, and said radiation source is placed to direct radiation through a face of said panel onto the said internal surface of said beveled edge for total internal reflection within said panel of the radiation transmitted to said beveled edge.

15. The keyboard device of claim 11 in which a face of said panel is modified at the position of said at least one display element for enhancing the visibility of said at least one display element when irradiated.

16. The keyboard device of claim 15 in which said panel face is modified by etching.

17. The keyboard device of claim 11 in which said panel is a transparent membrane and said at least one circuit element is a keyboard membrane element.

18. The keyboard device of claim 11 in which said display element is separate from but aligned with said circuit element.

* * * * *